(12) United States Patent
Yao et al.

(10) Patent No.: US 12,529,872 B2
(45) Date of Patent: Jan. 20, 2026

(54) LENS ASSEMBLY AND IMAGE CAPTURE APPARATUS THEREOF

(71) Applicants: Sintai Optical (Shenzhen) Co., Ltd., ShenZhen (CN); Asia Optical Co., Inc., Taichung (TW)

(72) Inventors: Chun-Yang Yao, Taichung (TW); Hsi-Ling Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 571 days.

(21) Appl. No.: 18/060,984

(22) Filed: Dec. 2, 2022

(65) Prior Publication Data
US 2023/0213741 A1  Jul. 6, 2023

(30) Foreign Application Priority Data
Jan. 4, 2022 (CN) .......................... 202210002918.4

(51) Int. Cl.
*G02B 15/14* (2006.01)
*G02B 13/00* (2006.01)
*G02B 15/15* (2006.01)

(52) U.S. Cl.
CPC ..... *G02B 15/1431* (2019.08); *G02B 13/0045* (2013.01); *G02B 15/15* (2013.01)

(58) Field of Classification Search
CPC .............. G02B 15/1431; G02B 13/0045; G02B 15/15; G02B 13/009; G02B 15/143107; G02B 15/177

See application file for complete search history.

(56) References Cited

U.S. PATENT DOCUMENTS

| | | | | |
|---|---|---|---|---|
| 2006/0056051 | A1* | 3/2006 | Hakko | G02B 15/143107 359/686 |
| 2010/0214664 | A1 | 8/2010 | Chia | |
| 2016/0377844 | A1* | 12/2016 | Cheng | G02B 13/143 359/355 |
| 2018/0348491 | A1* | 12/2018 | Lee | G02B 9/64 |
| 2019/0086638 | A1* | 3/2019 | Lee | H04N 23/687 |
| 2021/0231929 | A1 | 7/2021 | Fujisaki | |
| 2023/0367230 | A1* | 11/2023 | Murakami | G03F 7/70291 |
| 2024/0353653 | A1* | 10/2024 | Shim | G02B 3/0087 |

FOREIGN PATENT DOCUMENTS

| | | |
|---|---|---|
| CN | 1150252 A | 5/1997 |
| CN | 101211003 A | 7/2008 |
| CN | 104937471 A | 9/2015 |

(Continued)

*Primary Examiner* — Mariam Qureshi
(74) *Attorney, Agent, or Firm* — McClure, Qualey & Rodack, LLP

(57) ABSTRACT

A lens assembly includes a first lens group, a second lens group, and a third lens group, all of which are arranged in order from a first side to a second side along an optical axis. The first lens group is with positive refractive power. The second lens group is with positive refractive power. The third lens group is with positive refractive power. The first lens group is fixed, the second lens group can move along the optical axis, and the third lens group can move along the optical axis, so that the lens assembly is zoomed from a wide-angle end to a telephoto end to change an effective focal length.

20 Claims, 10 Drawing Sheets

(56) References Cited

FOREIGN PATENT DOCUMENTS

| | | |
|---|---|---|
| EP | 0688440 B1 | 8/2002 |
| JP | 2013125213 A | 6/2013 |
| JP | 20142271 A | 1/2014 |
| JP | 2016126277 A | 7/2016 |
| KR | 20120058653 A | 6/2012 |

\* cited by examiner

LENS ASSEMBLY AND IMAGE CAPTURE APPARATUS THEREOF

BACKGROUND OF THE INVENTION

Field of the Invention

The invention relates to a lens assembly and image capture apparatus thereof.

Description of the Related Art

The total length of the traditional optical zoom lens is significantly longer, and as the zoom magnification becomes larger, the total length of the lens assembly becomes longer. Today's thin and light camera device such as smartphone, tablet, mobile device, etc. cannot be equipped with optical zoom lens which is too long. Therefore, a lens assembly needs a new structure having miniaturization, high resolution, and optical zoom at the same time, in order to meet the requirement of smartphone for optical zoom function.

BRIEF SUMMARY OF THE INVENTION

The invention provides a lens assembly and image capture apparatus thereof, which can solve the above problems. The lens assembly of the invention is provided with characteristics of a decreased total lens length, an increased resolution, an optical zoom function, and still has a good optical performance.

The lens assembly in accordance with an exemplary embodiment of the invention includes a first lens group, a second lens group, and a third lens group, all of which are arranged in order from a first side to a second side along an optical axis. The first lens group is with positive refractive power. The second lens group is with positive refractive power. The third lens group is with positive refractive power. The first lens group is fixed, the second lens group can move along the optical axis, and the third lens group can move along the optical axis, so that the lens assembly is zoomed from a wide-angle end to a telephoto end to change an effective focal length. The basic operation of the lens assembly in the present invention can be achieved by satisfying the features of the exemplary embodiments without requiring other conditions.

In another exemplary embodiment, the first lens group includes a first lens, a second lens, and a third lens; the first lens, the second lens, and the third lens are arranged in order from the first side to the second side along the optical axis; the second lens group includes a fourth lens and a fifth lens; the fourth lens and the fifth lens are arranged in order from the first side to the second side along the optical axis; the third lens group includes a sixth lens, a seventh lens, and an eighth lens; and the sixth lens, the seventh lens, and the eighth lens are arranged in order from the first side to the second side along the optical axis.

In yet another exemplary embodiment, the first lens is with negative refractive power, the second lens is with positive refractive power, the third lens is with negative refractive power, the fourth lens is with positive refractive power, the fifth lens is with positive refractive power, the sixth lens is with negative refractive power, the seventh lens is with positive refractive power, and the eighth lens is with positive refractive power.

In another exemplary embodiment, the first lens is a meniscus lens and includes a convex surface facing the first side and a concave surface facing the second side; the second lens is a biconvex lens and includes a convex surface facing the first side and another convex surface facing the second side; and the third lens is a meniscus lens and includes a convex surface facing the first side and a concave surface facing the second side.

In yet another exemplary embodiment, the fourth lens is a meniscus lens and includes a concave surface facing the first side and a convex surface facing the second side; and the fifth lens is a meniscus lens and includes a concave surface facing the first side and a convex surface facing the second side.

In another exemplary embodiment, the sixth lens is a meniscus lens and includes a concave surface facing the first side and a convex surface facing the second side; the seventh lens is a meniscus lens and includes a concave surface facing the first side and a convex surface facing the second side; and the eighth lens includes a convex surface facing the second side.

In yet another exemplary embodiment, the eighth lens is a biconvex lens and further includes another convex surface facing the first side.

In another exemplary embodiment, the eighth lens is a meniscus lens and further includes a concave surface facing the first side.

In yet another exemplary embodiment, the second lens group moves to the second side along the optical axis and the third lens group moves to the second side along the optical axis, so that the interval between the first lens group and the second lens group is increased and the interval between the second lens group and the third lens group is increased.

In another exemplary embodiment, the lens assembly further includes a stop disposed between the first side and the second side, wherein the lens assembly satisfies at least one of the following conditions: $3<TTL/STD<5$; $4<(f7+f8)/STD<12$; $5<(f4+f5)/STD<8$; $4.6<(EFLw+EFLt)/STD<7$; wherein TTL is an interval from a first side surface of the first lens to an image plane along the optical axis, STD is an effective optical diameter of the stop, f4 is an effective focal length of the fourth lens, f5 is an effective focal length of the fifth lens, f7 is an effective focal length of the seventh lens, f8 is an effective focal length of the eighth lens, EFLw is an effective focal length of the lens assembly at the wide-angle end, and EFLt is an effective focal length of the lens assembly at the telephoto end.

In yet another exemplary embodiment, the lens assembly satisfies at least one of the following conditions: $180\ mm^2<f7\times f8<800\ mm^2$; $250\ mm^2<f4\times f5<350\ mm^2$; $20\ mm^2<R51\times R52<62\ mm^2$; $2.2<TTL/(G12w+G12t)<4.4$; $7<TTL/(G23w+G23t)<20$; $1<G12w/G23w<6$; $3<G12t/G23t<9$; $3<G12t-G12w<6$; $9\ mm<EFLt-EFLw<13\ mm$; wherein f4 is an effective focal length of the fourth lens, f5 is an effective focal length of the fifth lens, f7 is an effective focal length of the seventh lens, f8 is an effective focal length of the eighth lens, R51 is a radius of curvature of a first side surface of the fifth lens and R52 is a radius of curvature of a second side surface of the fifth lens, TTL is an interval from a first side surface of the first lens to an image plane along the optical axis, G12w is an interval from the first lens group to the second lens group along the optical axis at the wide-angle end, G12t is an interval from the first lens group to the second lens group along the optical axis at the telephoto end, G23w is an interval from the second lens group to the third lens group along the optical axis at the wide-angle end, G23t is an interval from the second lens group to the third lens group along the optical axis at the telephoto end, EFLw is an effective focal length of the lens assembly at the wide-angle end, and EFLt is an effective focal length of the lens assembly at the telephoto end.

The image capture apparatus in accordance with an exemplary embodiment of the invention includes a lens assembly, an image sensing element, an optical path turning element, and an actuator. The image sensing element is disposed between the third lens group and the second side. The optical path turning element is disposed between the first side and the first lens group. The actuator is disposed on one side of the lens assembly. The optical path turning element, the lens assembly, and the image sensing element are arranged in order from the first side to the second side along the optical axis. The first lens group is fixed, the second lens group driven by the actuator to move to the second side along the optical axis, and the third lens group driven by the actuator to move to the second side along the optical axis, so that the lens assembly is zoomed from the wide-angle end to the telephoto end to change the effective focal length.

The lens assembly in accordance with another exemplary embodiment of the invention includes a first lens group, a second lens group, and a third lens group, all of which are arranged in order from a first side to a second side along an optical axis. The first lens group is with positive refractive power. The second lens group is with positive refractive power. The third lens group is with positive refractive power. The first lens group includes a first lens, a second lens, and a third lens; the first lens, the second lens, and the third lens are arranged in order from the first side to the second side along the optical axis; the second lens group includes a fourth lens and a fifth lens; the fourth lens and the fifth lens are arranged in order from the first side to the second side along the optical axis; the third lens group includes a sixth lens, a seventh lens, and an eighth lens; and the sixth lens, the seventh lens, and the eighth lens are arranged in order from the first side to the second side along the optical axis. The basic operation of the lens assembly in the present invention can be achieved by satisfying the features of the exemplary embodiments without requiring other conditions.

In another exemplary embodiment, the first lens is with negative refractive power, the second lens is with positive refractive power, the third lens is with negative refractive power, the fourth lens is with positive refractive power, the fifth lens is with positive refractive power, the sixth lens is with negative refractive power, the seventh lens is with positive refractive power, and the eighth lens is with positive refractive power.

In yet another exemplary embodiment, the first lens is a meniscus lens and includes a convex surface facing the first side and a concave surface facing the second side; the second lens is a biconvex lens and includes a convex surface facing the first side and another convex surface facing the second side; the third lens is a meniscus lens and includes a convex surface facing the first side and a concave surface facing the second side; the fourth lens is a meniscus lens and includes a concave surface facing the first side and a convex surface facing the second side; the fifth lens is a meniscus lens and includes a concave surface facing the first side and a convex surface facing the second side; the sixth lens is a meniscus lens and includes a concave surface facing the first side and a convex surface facing the second side; the seventh lens is a meniscus lens and includes a concave surface facing the first side and a convex surface facing the second side; and the eighth lens includes a convex surface facing the second side.

The lens assembly in accordance with yet another exemplary embodiment of the invention includes a first lens group, a second lens group, and a third lens group, all of which are arranged in order from a first side to a second side along an optical axis. The first lens group is with positive refractive power. The second lens group is with positive refractive power. The third lens group is with positive refractive power. The second lens group includes a fourth lens and a fifth lens; the fourth lens and the fifth lens are arranged in order from the first side to the second side along the optical axis; the third lens group includes a sixth lens, a seventh lens, and an eighth lens; and the sixth lens, the seventh lens, and the eighth lens are arranged in order from the first side to the second side along the optical axis. The lens assembly zooms from a wide-angle end to a telephoto end to change an effective focal length and satisfies at least one of the following conditions: $7<TTL/(G23w+G23t)<20$; $3<G12t/G23t<9$; $3<G12t-G12w<6$; $180\ mm^2<f7\times f8<800\ mm^2$; $250\ mm^2<f4\times f5<350\ mm^2$; $20\ mm^2<R51\times R52<62\ mm^2$; wherein TTL is an interval from a first side surface of the first lens to an image plane along the optical axis, G12w is an interval from the first lens group to the second lens group along the optical axis at the wide-angle end, G12t is an interval from the first lens group to the second lens group along the optical axis at the telephoto end, G23w is an interval from the second lens group to the third lens group along the optical axis at the wide-angle end, G23t is an interval from the second lens group to the third lens group along the optical axis at the telephoto end, f4 is an effective focal length of the fourth lens, f5 is an effective focal length of the fifth lens, f7 is an effective focal length of the seventh lens, f8 is an effective focal length of the eighth lens, R51 is a radius of curvature of a first side surface of the fifth lens, and R52 is a radius of curvature of a second side surface of the fifth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a lens assembly including a first lens group, a second lens group, and a third lens group. The first lens group is with positive refractive power. The second lens group is with positive refractive power. The third lens group is with positive refractive power. The first lens group, the second lens group, and the third lens group are arranged in order from a first side to a second side along an optical axis.

The present invention provides an image capture apparatus including a lens assembly, an image sensing element, an optical path turning element, and an actuator. The image sensing element is disposed between a third lens group and a second side. The optical path turning element is disposed between a first side and a first lens group. The actuator is disposed on one side of the lens assembly. The optical path turning element, the lens assembly, and the image sensing element are arranged in order from the first side to the second side along an optical axis. The first lens group is fixed, a second lens group driven by the actuator to move to the second side along the optical axis, and the third lens group driven by the actuator to move to the second side along the optical axis, so that the lens assembly is zoomed from a wide-angle end to a telephoto end to change an effective focal length.

Figure 1:
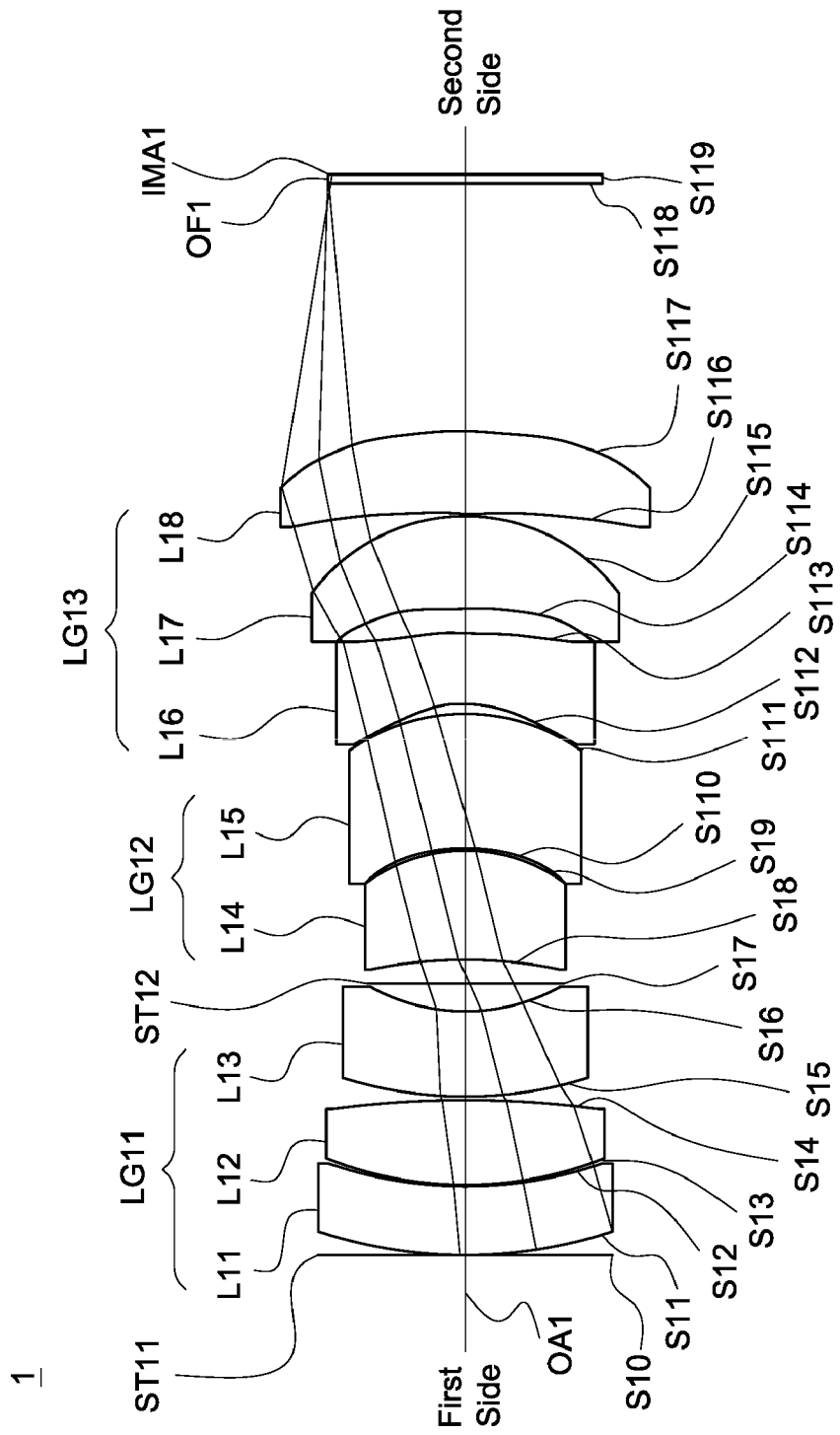
FIG. 1 and FIG. 2 are lens layout and optical path diagrams of a lens assembly at a wide-angle end and a telephoto end in accordance with a first embodiment of the invention, respectively.
Figure 2:
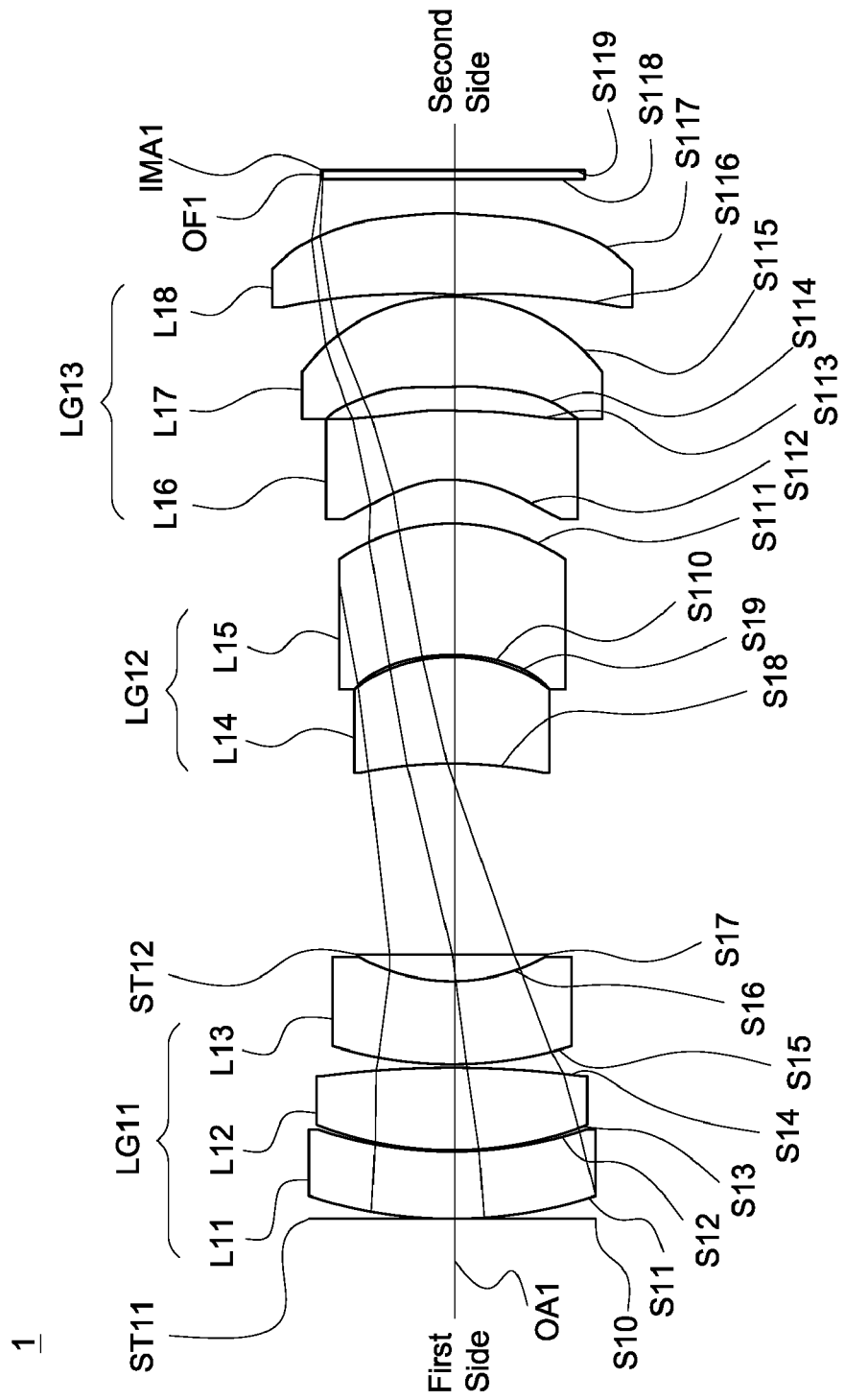
Figure 4:
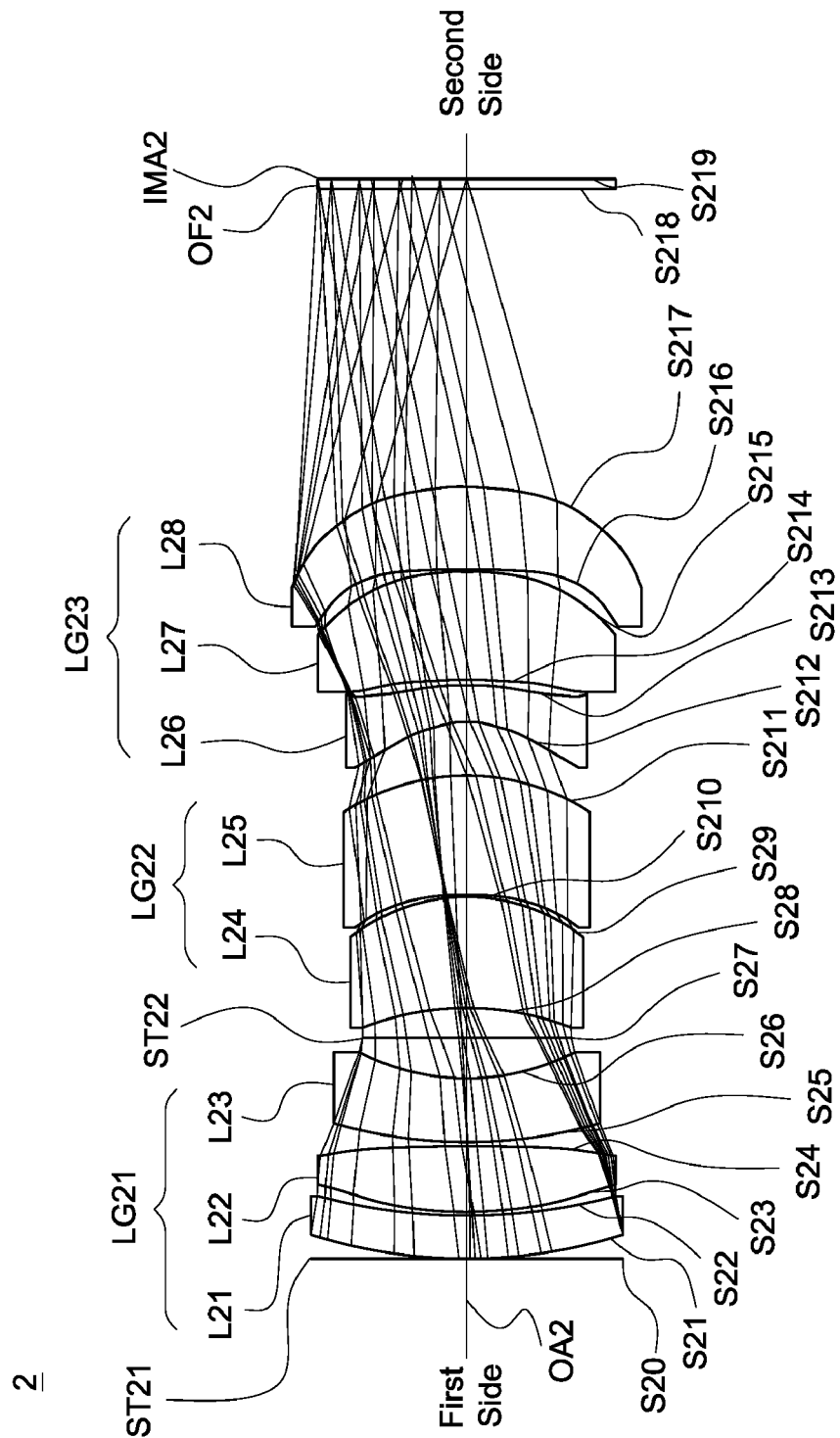
FIG. 4 and FIG. 5 are lens layout and optical path diagrams of a lens assembly at a wide-angle end and a telephoto end in accordance with a second embodiment of the invention, respectively.
Figure 5:
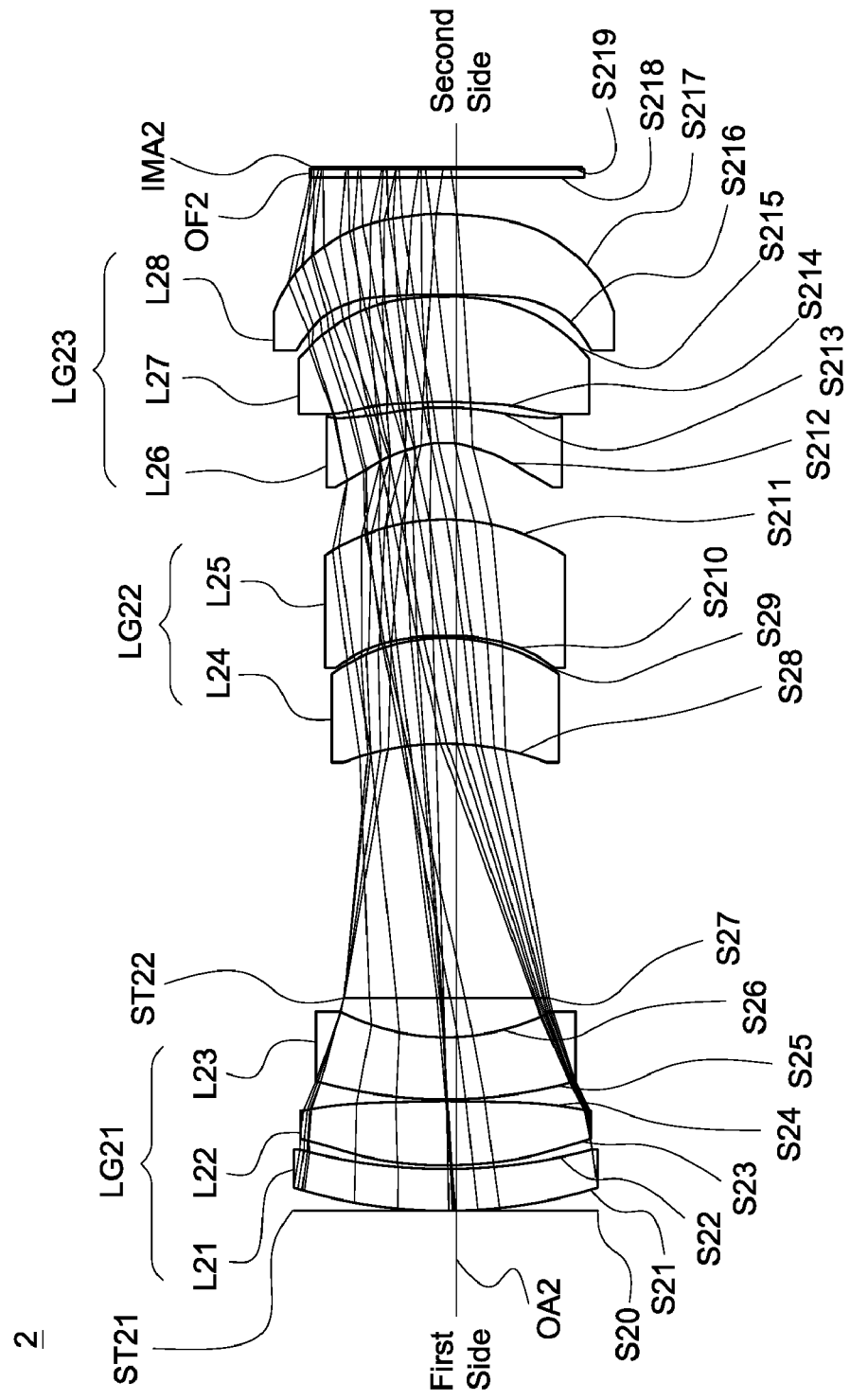
Figure 6:
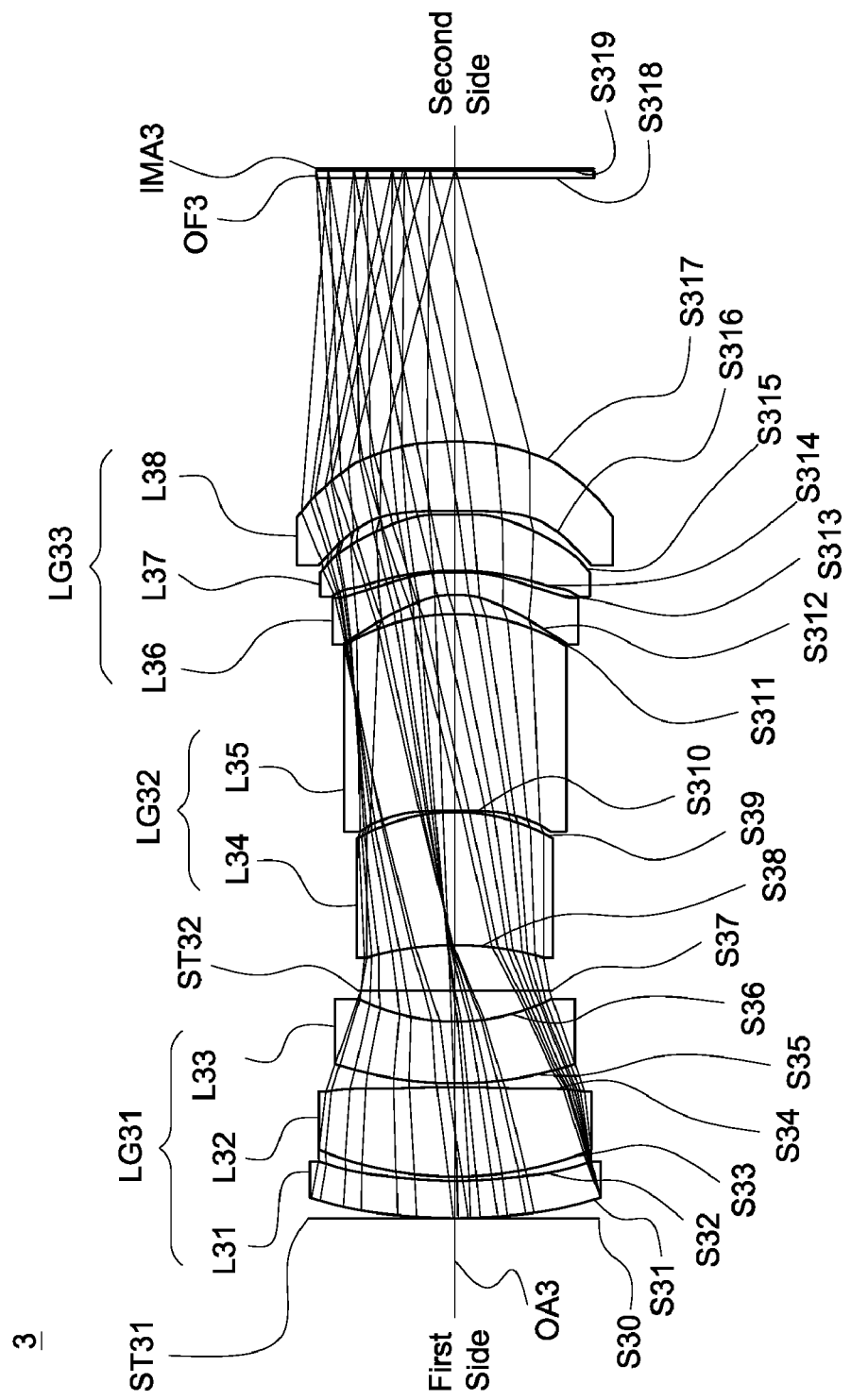
FIG. 6 and FIG. 7 are lens layout and optical path diagrams of a lens assembly at a wide-angle end and a telephoto end in accordance with a third embodiment of the invention, respectively.
Figure 7:
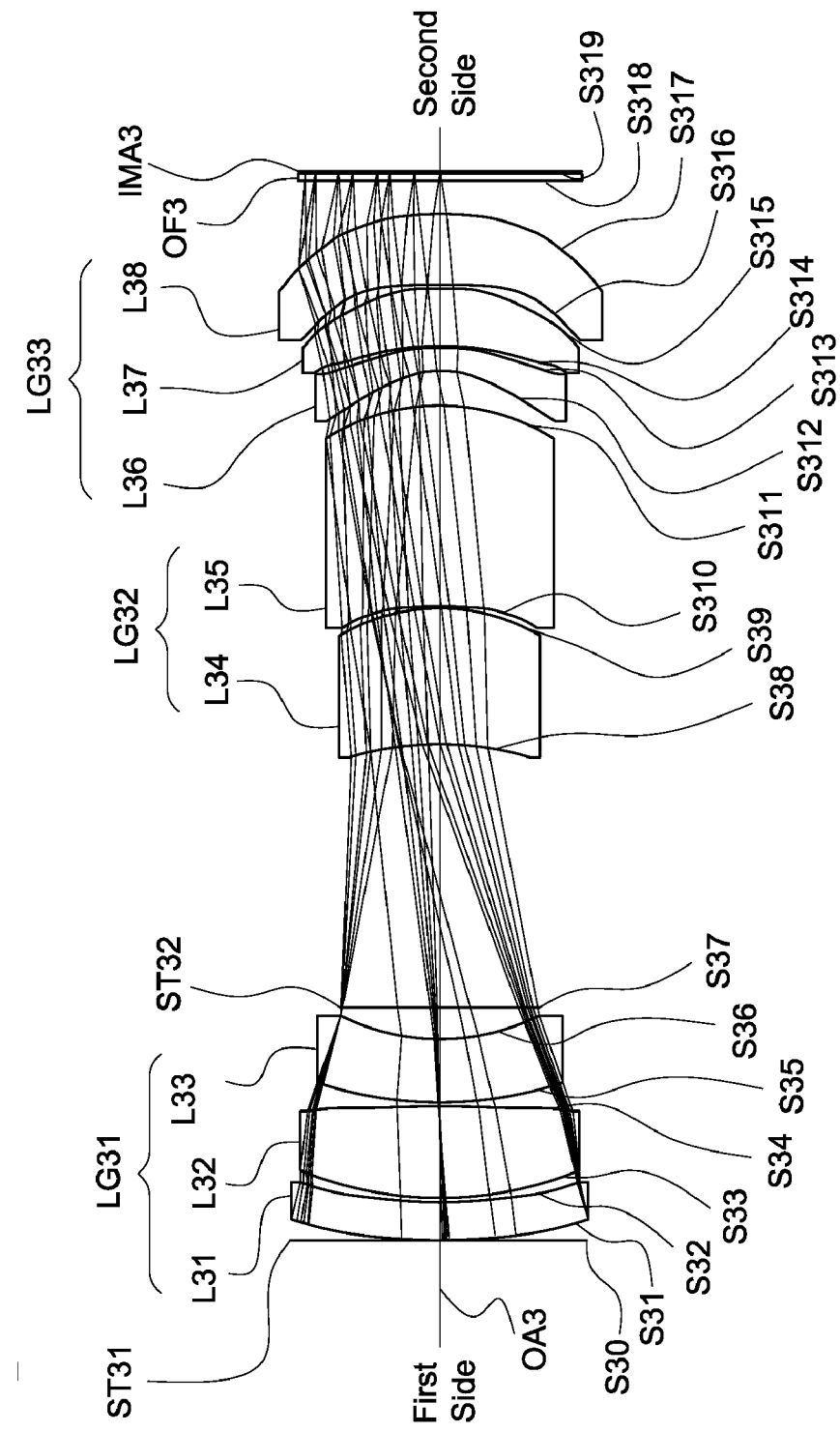

The effective focal length of the lens assembly of the present invention is a variable effective focal length and the zoom magnification of each embodiment of the lens assembly is about 2 times from the wide-angle end to the telephoto end. When the lens assembly is equipped with another fixed-focus wide-angle lens assembly in a mobile phone, tablet or other camera device, the effective focal length of the lens assembly of the present invention has a zoom magnification of 4 to 8 times relative to the effective focal length of the fixed-focus wide-angle lens assembly. Taking the lens assembly of the first embodiment of the present invention as an example, the effective focal length at the wide-angle end is 15.082 mm, the effective focal length at the telephoto end is 25.629 mm, and the zoom magnification is 1.70 (25.629 mm/15.082 mm=1.70) times from the wide-angle end to the telephoto end, which is approximately 2 times, when equipped with a fixed-focus wide-angle lens assembly having an effective focal length of 3.40 mm in a mobile phone, tablet or other camera device and let the effective focal length of the fixed-focus wide-angle lens assembly as the magnification basis, so the lens assembly of the present invention has a zoom magnification ranging from 4 (15.082 mm/3.40 mm=4.44≈4) times to 8 (25.629 mm/3.40 mm=7.54≈8) times relative to a fixed-focus wide-angle lens assembly with an effective focal length of 3.40 mm. However, the present invention is not limited to this, and it can have a higher zoom magnification such as 10 times or more, when it is configured in the camera device with another fixed-focus wide-angle lens assembly. Referring to Table 1, Table 2, Table 4, Table 5, Table 7, and Table 8, wherein Table 1, Table 4, and Table 7 show optical specification in accordance with a first, second, and third embodiments of the invention, respectively and Table 2, Table 5, and Table 8 show aspheric coefficients of each aspheric lens in Table 1, Table 4, and Table 7, respectively. FIG. 1, FIG. 4, and FIG. 6 are lens layout and optical path diagrams of a lens assembly at a wide-angle end in accordance with a first, second, and third embodiments of the invention, respectively. FIG. 2, FIG. 5, and FIG. 7 are lens layout and optical path diagrams of the lens assembly at a telephoto end in accordance with the first, second, and third embodiments of the invention, respectively.

The first lens groups LG11, LG21, LG31 are with positive refractive power and include first lenses L11, L21, L31, second lenses L12, L22, L32, and third lenses L13, L23, L23, respectively. The second lens groups LG12, LG22, LG32 are with positive refractive power and include fourth lenses L14, L24, L34, and fifth lenses L15, L25, L35, respectively. The third lens groups LG13, LG23, LG33 are with positive refractive power and include sixth lenses L16, L26, L36, seventh lenses L17, L27, L37, and eighth lenses L18, L28, L38, respectively.

The first lenses L11, L21, L31 are meniscus lenses with negative refractive power and made of glass material, wherein the first side surfaces S11, S21, S31 are convex surfaces, the second side surfaces S12, S22, S32 are concave surfaces, and both of the first side surfaces S11, S21, S31 and second side surfaces S12, S22, S32 are aspheric surfaces. The second lenses L12, L22, L32 are biconvex lenses with positive refractive power and made of glass material, wherein the first side surfaces S13, S23, S33 are convex surfaces, the second side surfaces S14, S24, S34 are convex surfaces, and both of the first side surfaces S13, S23, S33 and second side surfaces S14, S24, S34 are aspheric surfaces. The third lenses L13, L23, L33 are meniscus lenses with negative refractive power and made of glass material, wherein the first side surfaces S15, S25, S35 are convex surfaces, the second side surfaces S16, S26, S36 are concave surfaces, and both of the first side surfaces S15, S25, S35 and second side surfaces S16, S26, S36 are aspheric surfaces. The fourth lenses L14, L24, L34 are meniscus lenses with positive refractive power and made of plastic material, wherein the first side surfaces S18, S28, S38 are concave surfaces, the second side surfaces S19, S29, S39 are convex surfaces, and both of the first side surfaces S18, S28, S38 and second side surfaces S19, S29, S39 are aspheric surfaces. The fifth lenses L15, L25, L35 are meniscus lenses with positive refractive power and made of plastic material, wherein the first side surfaces S110, S210, S310 are concave surfaces, the second side surfaces S111, S211, S311 are convex surfaces, and both of the first side surfaces S110, S210, S310 and second side surfaces S111, S211, S311 are aspheric surfaces. The sixth lenses L16, L26, L36 are meniscus lenses with negative refractive power and made of plastic material, wherein the first side surfaces S112, S212, S312 are concave surfaces, the second side surfaces S113, S213, S313 are convex surfaces, and both of the first side surfaces S112, S212, S312 and second side surfaces S113, S213, S313 are aspheric surfaces. The seventh lenses L17, L27, L37 are meniscus lenses with positive refractive power and made of plastic material, wherein the first side surfaces S114, S214, S314 are concave surfaces, the second side surfaces S115, S215, S315 are convex surfaces, and both of the first side surfaces S114, S214, S314 and second side surfaces S115, S215, S315 are aspheric surfaces. The eighth lenses L18, L28, L38 are with positive refractive power and made of plastic material, wherein the second side surfaces S117, S217, S317 are convex surfaces and both of the first side surfaces S116, S216, S316 and second side surfaces S117, S217, S317 are aspheric surfaces.

In addition, the lens assemblies 1, 2, 3 satisfy at least one of the following conditions:

$$3 < TTL/STD < 5; \tag{1}$$

$$4 < (f7+f8)/STD < 12; \tag{2}$$

$$180 \text{ mm}^2 < f7 \times f8 < 800 \text{ mm}^2; \tag{3}$$

$$5 < (f4+f5)/STD < 8; \tag{4}$$

$250 \text{ mm}^2 < f4 \times f5 < 350 \text{ mm}^2;$  (5)

$20 \text{ mm}^2 < R51 \times R52 < 62 \text{ mm}^2;$  (6)

$4.6 < (EFLw + EFLt)/STD < 7;$  (7)

$2.2 < TTL/(G12w + G12t) < 4.4;$  (8)

$7 < TTL/(G23w + G23t) < 20;$  (9)

$1 < G12w/G23w < 6;$  (10)

$3 < G12t/G23t < 9;$  (11)

$3 < G12t - G12w < 6;$  (12)

$9 \text{ mm} < EFLt - EFLw < 13 \text{ mm};$  (13)

wherein TTL is respectively an interval from the first side surfaces S11, S21, S31 of the first lenses L11, L21, L31 to the image planes IMA1, IMA2, IMA3 along the optical axes OA1, OA2, OA3 for the first to third embodiments, STD is an effective optical diameter of the stop ST11, ST21, ST31 for the first to third embodiments, f4 is an effective focal length of the fourth lenses L14, L24, L34 for the first to third embodiments, f5 is an effective focal length of the fifth lenses L15, L25, L35 for the first to third embodiments, f7 is an effective focal length of the seventh lenses L17, L27, L37 for the first to third embodiments, f8 is an effective focal length of the eighth lenses L18, L28, L38 for the first to third embodiments, R51 is a radius of curvature of the first side surfaces S110, S210, S310 of the fifth lenses L15, L25, L35 for the first to third embodiments, R52 is a radius of curvature of the second side surfaces S111, S211, S311 of the fifth lenses L15, L25, L35 for the first to third embodiments, ELFw is an effective focal length of the lens assemblies 1, 2, 3 at the wide-angle end for the first to third embodiments, EFLt is an effective focal length of the lens assemblies 1, 2, 3 at the telephoto end for the first to third embodiments, G12w is respectively an interval from the first lens groups LG11, LG21, LG31 to the second lens groups LG12, LG22, LG32 along the optical axes OA1, OA2, OA3 at the wide-angle end for the first to third embodiments, G12t is respectively an interval from the first lens groups LG11, LG21, LG31 to the second lens groups LG12, LG22, LG32 along the optical axes OA1, OA2, OA3 at the telephoto end for the first to third embodiments, G23w is respectively an interval from the second lens groups LG12, LG22, LG32 to the third lens groups LG13, LG23, LG33 along the optical axes OA1, OA2, OA3 at the wide-angle end for the first to third embodiments, and G23t is respectively an interval from the second lens groups LG12, LG22, LG32 to the third lens groups LG13, LG23, LG33 along the optical axes OA1, OA2, OA3 at the telephoto end for the first to third embodiments. With the lens assemblies 1, 2, 3 satisfying at least one of the above conditions (1)-(13), the total lens length can be effectively shortened, the resolution can be effectively increased, the aberration can be effectively corrected, the chromatic aberration can be effectively corrected, and optical zoom function can be realized. The preferred embodiment of the present invention can be achieved when the lens assembly satisfies at least one of the conditions (1)-(13).

A detailed description of a lens assembly in accordance with a first embodiment of the invention is as follows. Referring to FIG. 1 and FIG. 2, the lens assembly 1 includes a stop ST11, a first lens group LG11, a shading element ST12, a second lens group LG12, a third lens group LG13, and an optical filter OF1, all of which are arranged in order from a first side to a second side along an optical axis OA1. The first lens group LG11 includes a first lens L11, a second lens L12, and a third lens L13, all of which are arranged in order from the first side to the second side along the optical axis OA1. The second lens group LG12 includes a fourth lens L14 and a fifth lens L15, both of which are arranged in order from the first side to the second side along the optical axis OA1. The third lens group LG13 includes a sixth lens L16, a seventh lens L17, and an eighth lens L18, all of which are arranged in order from the first side to the second side along the optical axis OA1. In operation, a light from the first side is imaged on an image plane IMA1.

When the lens assembly 1 zooms from a wide-angle end (as shown in FIG. 1) to a telephoto end (as shown in FIG. 2), the first lens group LG11 is fixed, the second lens group LG12 moves to the second side along the optical axis OA1, and the third lens group LG13 moves to the second side along the optical axis OA1, so that the interval between the first lens group LG11 and the second lens group LG12 is increased and the interval between the second lens group LG12 and the third lens group LG13 is increased. The zoom magnification is approximately 1.70 times (25.629 mm/15.082 mm≈1.70) as the lens assembly 1 of the first embodiment zooms from the wide-angle end (as shown in FIG. 1) to the telephoto end (as shown in FIG. 2).

According to the foregoing, wherein: the eighth lens L18 is a biconvex lens, wherein the first side surface S116 is a convex surface; and both of the first side surface S118 and second side surface S119 of the optical filter OF1 are plane surfaces. With the above design of the lenses, stop ST11, shading element ST12, and at least one of the conditions (1)-(13) satisfied, the lens assembly 1 can have an effective shortened total lens length, an effective increased resolution, an effective corrected aberration, an preferred embodiment of the present invention can be achieved when the lens assembly satisfies at least one of the conditions (1)-(13), refractive power distribution, and surface shape.

Table 1 shows the optical specification of the lens assembly 1 in FIG. 1 and FIG. 2 when the lens assembly 1 is at the wide-angle end and telephoto end, respectively.

TABLE 1

| | Wide-angle End | | Effective Focal Length = 15.082 mm | | | F-number = 2.285 | |
| | | | Total Lens Length = 26.33 mm | | | Field of View = 22.098 degrees | |
| | Telephoto End | | Effective Focal Length = 25.629 mm | | | F-number = 3.883 | |
| | | | Total Lens Length = 26.33 mm | | | Field of View = 13.110 degrees | |

| Surface Number | Radius of Curvature (mm) | Thickness (mm) | Nd | Vd | Effective Focal Length (mm) | Remark |
|---|---|---|---|---|---|---|
| S10 | ∞ | 0 | | | | ST11 |
| S11 | 7.839 | 1.704 | 2.002 | 19.325 | −28.006 | L11 |
| S12 | 5.468 | 0.024 | | | | |

TABLE 1-continued

| | | | | | | |
|---|---|---|---|---|---|---|
| S13 | 6.375 | 2.066 | 1.594 | 67.290 | 8.062 | L12 |
| S14 | −17.122 | 0.059 | | | | |
| S15 | 5.639 | 2.083 | 2.002 | 19.325 | −14.295 | L13 |
| S16 | 3.303 | 0.709 | | | | |
| S17 | ∞ | 0.546(Wide-angle End) 4.831(Telephoto End) | | | | ST12 |
| S18 | −8.655 | 2.676 | 1.651 | 21.514 | 7.621 | L14 |
| S19 | −3.558 | 0.045 | | | | |
| S110 | −4.890 | 3.268 | 1.544 | 55.951 | 44.680 | L15 |
| S111 | −5.034 | 0.248(Wide-angle End) 1.262(Telephoto End) | | | | |
| S112 | −2.341 | 1.733 | 1.671 | 19.243 | −5.347 | L16 |
| S113 | −8.593 | 0.591 | | | | |
| S114 | −18.480 | 2.254 | 1.544 | 55.951 | 13.440 | L17 |
| S115 | −5.476 | 0.049 | | | | |
| S116 | 16.089 | 1.999 | 1.544 | 55.951 | 14.867 | L18 |
| S117 | −15.647 | 6.051(Wide-angle End) 0.896(Telephoto End) | | | | |
| S118 | ∞ | 0.210 | 1.500 | 60.000 | | OF1 |
| S119 | ∞ | 0.014 | | | | |

The aspheric surface sag z of each aspheric lens in table 1 can be calculated by the following formula:

$$z = ch^2/\{1 + [1 - (k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the axis, k is conic constant and A, B, C, D, E, F and G are aspheric coefficients.

In the first embodiment, the conic constant k and the aspheric coefficients A, B, C, D, E, F, G of each aspheric lens are shown in Table 2.

TABLE 2

| Surface Number | k | A | B | C | D | E | F | G |
|---|---|---|---|---|---|---|---|---|
| S11 | −10.36 | 2.208E−04 | −3.490E−06 | −4.023E−07 | 3.009E−07 | −1.571E−09 | −3.068E−09 | 1.622E−10 |
| S12 | −20.90 | 5.252E−04 | 6.420E−05 | 1.583E−06 | −7.380E−07 | −8.667E−08 | 2.694E−09 | 8.852E−10 |
| S13 | −41.51 | 4.126E−03 | 5.501E−05 | −6.585E−06 | −1.848E−06 | −2.786E−08 | 3.129E−09 | 1.087E−09 |
| S14 | 15.00 | 1.312E−03 | 1.443E−04 | −9.541E−06 | −4.220E−07 | 3.801E−08 | −3.518E−08 | 2.935E−09 |
| S15 | −6.77 | −1.520E−03 | −1.131E−05 | 4.488E−05 | −1.858E−06 | −4.350E−07 | −3.053E−08 | 6.158E−09 |
| S16 | −1.64 | −3.783E−03 | 3.954E−04 | 1.417E−04 | −1.821E−05 | −4.679E−06 | 3.739E−07 | 6.926E−08 |
| S18 | −10.18 | −4.625E−04 | 3.606E−04 | −8.451E−05 | 5.134E−05 | −1.904E−05 | 3.387E−06 | −2.072E−07 |
| S19 | −4.55 | −1.732E−02 | 2.935E−03 | −1.545E−04 | −8.133E−05 | 1.140E−05 | 3.180E−07 | −8.322E−08 |
| S110 | −6.54 | −2.177E−02 | 2.593E−03 | −1.504E−04 | −7.699E−05 | 2.355E−06 | 2.136E−06 | −1.711E−07 |
| S111 | −6.83 | −1.044E−02 | 7.739E−04 | −3.586E−05 | −6.238E−06 | 3.027E−07 | 1.286E−07 | −1.078E−08 |
| S112 | −2.62 | −2.850E−03 | 1.409E−03 | −2.353E−04 | 1.048E−05 | 2.241E−07 | 4.372E−07 | −5.773E−08 |
| S113 | 0.95 | 5.025E−03 | −3.249E−04 | 1.597E−05 | 1.108E−05 | −4.129E−06 | 6.974E−07 | −4.043E−08 |
| S114 | 37.96 | −5.637E−03 | −8.045E−04 | −4.233E−05 | 3.660E−05 | −1.722E−06 | −2.390E−07 | 1.833E−08 |
| S115 | −0.53 | −1.796E−02 | 2.557E−03 | −2.112E−04 | −8.853E−07 | 3.105E−06 | −3.392E−07 | 1.146E−08 |
| S116 | 15.13 | −1.727E−02 | 2.214E−03 | −2.166E−04 | 3.475E−05 | −4.347E−06 | 2.545E−07 | −5.476E−09 |
| S117 | −15.47 | −1.319E−03 | −9.118E−04 | 1.480E−04 | −9.001E−06 | 3.425E−08 | 1.608E−08 | −4.354E−10 |

Table 3 shows the parameters and condition values for conditions (1)-(13) in accordance with the lens assembly 1 of the first embodiment. It can be seen from Table 3 that the lens assembly 1 of the first embodiment satisfies the conditions (1)-(13). In order to achieve the preferred embodiment of the present invention, at least one of the conditions (1)-(13) is satisfied.

TABLE 3

| | | | | | |
|---|---|---|---|---|---|
| STD | 6.600 mm | G12w | 1.254 mm | G12t | 5.539 mm |
| G23w | 0.248 mm | G23t | 1.262 mm | EFLt-EFLw | 10.548 mm |
| TTL/STD | 3.989 | TTL/(G23w + G23t) | 17.434 | (f7 + f8)/STD | 4.289 |
| f7 × f8 | 199.818 mm² | (f4 + f5)/STD | 7.924 | f4 × f5 | 340.521 mm² |
| R51 × R52 | 24.616 mm² | (EFLw + EFLt)/STD | 6.168 | TTL/(G12w + G12t) | 3.875 |
| G12w/G23w | 5.056 | G12t/G23t | 4.389 | G12t-G12w | 4.285 |

Figure 3A:
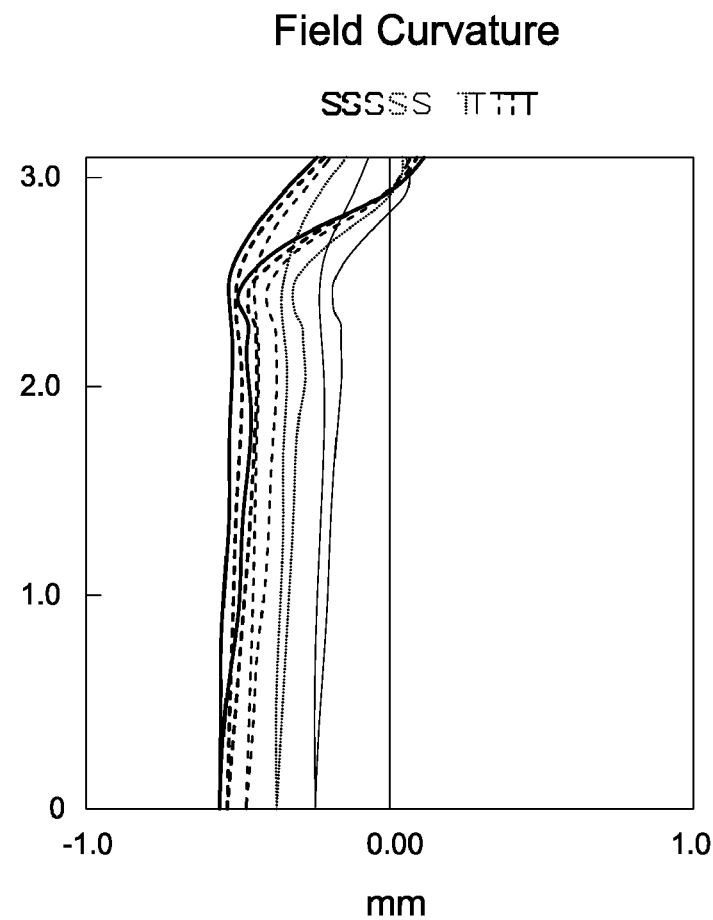
FIG. 3A, FIG. 3B, and FIG. 3C depict a field curvature diagram, a distortion diagram, and modulation transfer function diagram of the lens assembly at the wide-angle end in accordance with the first embodiment of the invention, respectively.
Figure 3B:
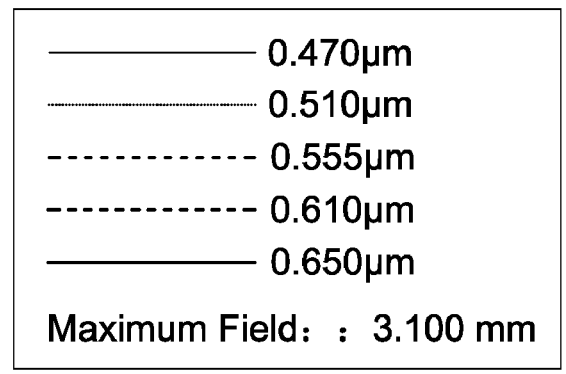
Figure 3B:
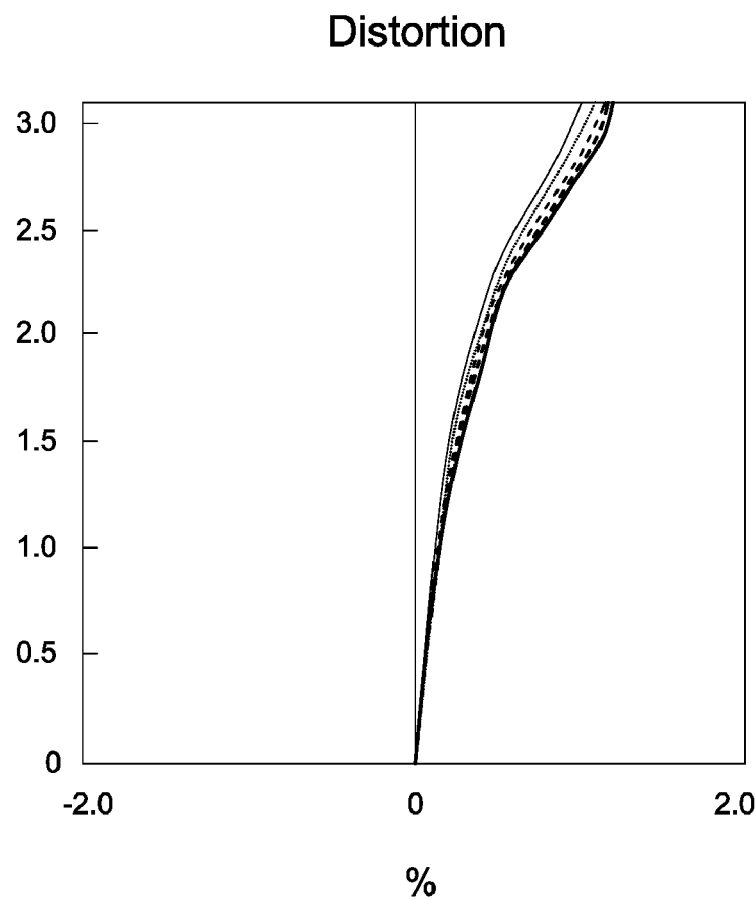
Figure 3C:
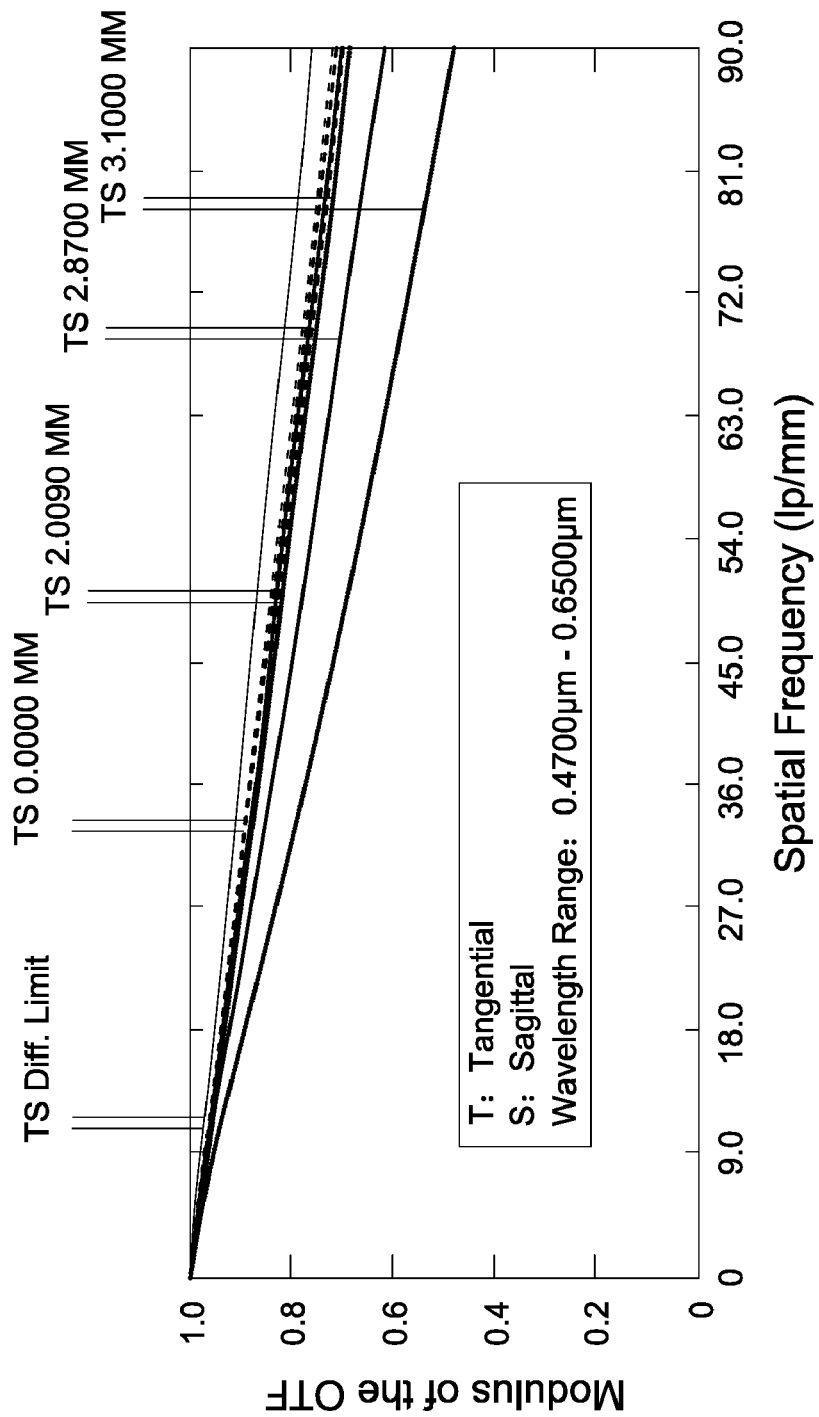

In addition, the lens assembly 1 of the first embodiment can meet the requirements of optical performance as seen in FIGS. 3A-3C. It can be seen from FIG. 3A that the field curvature of tangential direction and sagittal direction in the lens assembly 1 of the first embodiment at the wide-angle end ranges from −0.6 mm to 0.1 mm. It can be seen from FIG. 3B that the distortion in the lens assembly 1 of the first embodiment at the wide-angle end ranges from 0% to 1.2%. It can be seen from FIG. 3C that the modulation transfer function of tangential direction and sagittal direction in the lens assembly 1 of the first embodiment at the wide-angle end ranges from 0.58 to 1.0. It is obvious that the field curvature and the distortion of the lens assembly 1 of the first embodiment can be corrected effectively and the image resolution can meet the requirements. Therefore, the lens assembly 1 of the first embodiment is capable of good optical performance.

Referring to FIG. 4 and FIG. 5, the lens assembly 2 includes a stop ST21, a first lens group LG21, a shading element ST22, a second lens group LG22, a third lens group LG23, and an optical filter OF2, all of which are arranged in order from a first side to a second side along an optical axis OA2. The first lens group LG21 includes a first lens L21, a second lens L22, and a third lens L23, all of which are arranged in order from the first side to the second side along the optical axis OA2. The second lens group LG22 includes a fourth lens L24 and a fifth lens L25, both of which are arranged in order from the first side to the second side along the optical axis OA2. The third lens group LG23 includes a sixth lens L26, a seventh lens L27, and an eighth lens L28, all of which are arranged in order from the first side to the second side along the optical axis OA2. In operation, a light from the first side is imaged on an image plane IMA2.

When the lens assembly 2 zooms from a wide-angle end (as shown in FIG. 4) to a telephoto end (as shown in FIG. 5), the first lens group LG21 is fixed, the second lens group LG22 moves to the second side along the optical axis OA2, and the third lens group LG23 moves to the second side along the optical axis OA2, so that the interval between the first lens group LG21 and the second lens group LG22 is increased and the interval between the second lens group LG22 and the third lens group LG23 is increased. The zoom magnification is approximately 1.97 times (25.788 mm/13.100 mm≈1.97) as the lens assembly 2 of the second embodiment zooms from the wide-angle end (as shown in FIG. 4) to the telephoto end (as shown in FIG. 5).

According to the foregoing, wherein: the eighth lens L28 is a biconvex lens, wherein the first side surface S216 is a convex surface; and both of the first side surface S218 and second side surface S219 of the optical filter OF2 are plane surfaces. With the above design of the lenses, stop ST21, shading element ST22, and at least one of the conditions (1)-(13) satisfied, the lens assembly 2 can have an effective shortened total lens length, an effective increased resolution, an effective corrected aberration, an effective corrected chromatic aberration, and a realized optical zoom function. The preferred embodiment of the present invention can be achieved when the lens assembly satisfies at least one of the conditions (1)-(13), refractive power distribution, and surface shape.

Table 4 shows the optical specification of the lens assembly 2 in FIG. 4 and FIG. 5 when the lens assembly 2 is at the wide-angle end and telephoto end, respectively.

TABLE 4

| Wide-angle End | Effective Focal Length = 13.100 mm | F-number = 1.98 |
|---|---|---|
| | Total Lens Length = 24.44 mm | Field of View = 24.046 degrees |
| Telephoto End | Effective Focal Length = 25.788 mm | F-number = 3.907 |
| | Total Lens Length = 24.44 mm | Field of View = 13.709 degrees |

| Surface Number | Radius of Curvature (mm) | Thickness (mm) | Nd | Vd | Effective Focal Length (mm) | Remark |
|---|---|---|---|---|---|---|
| S20 | ∞ | 0 | | | | ST21 |
| S21 | 8.448 | 0.945 | 2.002 | 19.325 | −34.677 | L21 |
| S22 | 6.424 | 0.108 | | | | |
| S23 | 5.528 | 1.488 | 1.594 | 67.290 | 7.621 | L22 |
| S24 | −22.859 | 0.057 | | | | |
| S25 | 6.995 | 1.479 | 2.002 | 19.325 | −15.142 | L23 |
| S26 | 4.291 | 0.897 | | | | |
| S27 | ∞ | 0.677(Wide-angle End) | | | | ST22 |
| | | 5.928(Telephoto End) | | | | |
| S28 | −5.215 | 2.516 | 1.651 | 21.514 | 13.122 | L24 |
| S29 | −3.869 | 0.045 | | | | |
| S210 | −6.822 | 2.683 | 1.544 | 55.951 | 24.140 | L25 |
| S211 | −5.119 | 1.216(Wide-angle End) | | | | |
| | | 1.856(Telephoto End) | | | | |
| S212 | −2.108 | 0.832 | 1.671 | 19.243 | −4.999 | L26 |
| S213 | −6.474 | 0.137 | | | | |
| S214 | −11.166 | 2.463 | 1.544 | 55.951 | 24.756 | L27 |

TABLE 4-continued

| | | | | | | |
|---|---|---|---|---|---|---|
| S215 | −6.589 | 0.020 | | | | |
| S216 | 22.456 | 1.880 | 1.544 | 55.951 | 9.146 | L28 |
| S217 | −6.228 | 6.738(Wide-angle End) 0.860(Telephoto End) | | | | |
| S218 | ∞ | 0.210 | 1.500 | 60.000 | | OF2 |
| S219 | | 0.031 | | | | |

The definition of aspheric surface sag z of each aspheric lens in Table 4 is the same as that of in Table 1, and is not described here again. In the second embodiment, the conic constant k and the aspheric coefficients A, B, C, D, E, F, G of each aspheric lens are shown in Table 5.

TABLE 5

| Surface Number | k | A | B | C | D | E | F | G |
|---|---|---|---|---|---|---|---|---|
| S21 | −13.81 | 8.111E−05 | 6.661E−06 | 3.644E−06 | 2.473E−07 | −1.124E−08 | −4.462E−09 | 2.464E−10 |
| S22 | −41.93 | 6.754E−05 | 1.177E−04 | 8.845E−06 | −4.602E−07 | −1.170E−07 | 2.687E−10 | 5.172E−10 |
| S23 | −45.93 | 3.100E−03 | 1.354E−04 | −1.482E−06 | −1.733E−06 | −2.567E−08 | −4.370E−09 | 5.584E−10 |
| S24 | 36.37 | 1.014E−03 | 7.672E−05 | −1.190E−05 | −6.683E−07 | 1.336E−07 | −1.925E−08 | 9.349E−10 |
| S25 | −6.18 | −8.006E−04 | 1.751E−05 | 2.289E−05 | −2.212E−06 | −7.186E−08 | 4.104E−09 | 5.665E−10 |
| S26 | −1.26 | −2.056E−03 | 3.739E−04 | −1.552E−05 | −2.798E−06 | −1.809E−07 | 1.522E−07 | −1.320E−08 |
| S28 | −4.79 | −1.808E−03 | 8.363E−04 | −2.762E−04 | 5.936E−05 | −1.265E−05 | 2.592E−06 | −2.346E−07 |
| S29 | −3.43 | −1.684E−02 | 3.081E−03 | −9.606E−05 | −6.799E−05 | 8.195E−06 | 2.519E−07 | −6.868E−08 |
| S210 | −11.87 | −2.464E−02 | 3.266E−03 | −9.749E−06 | −6.118E−05 | −1.631E−06 | 1.461E−06 | −9.793E−08 |
| S211 | −8.86 | −1.039E−02 | 7.149E−04 | −1.732E−05 | −1.344E−06 | −1.422E−07 | −1.547E−07 | 2.340E−08 |
| S212 | −2.20 | −3.081E−03 | 1.473E−03 | −2.944E−04 | 2.666E−05 | 1.249E−06 | −9.265E−07 | 1.172E−07 |
| S213 | −0.59 | 5.956E−03 | −4.744E−04 | 3.724E−05 | 1.988E−05 | −4.468E−06 | 7.037E−07 | −3.156E−08 |
| S214 | 8.54 | 1.927E−03 | −1.017E−03 | 4.185E−05 | 2.324E−05 | −1.302E−06 | −8.112E−08 | 1.641E−08 |
| S215 | −1.42 | −1.601E−02 | 2.268E−03 | −2.173E−04 | 1.136E−06 | 2.789E−06 | −3.663E−07 | 1.559E−08 |
| S216 | 46.61 | −2.116E−02 | 1.700E−03 | −2.034E−04 | 3.274E−05 | −4.466E−06 | 2.464E−07 | −4.028E−09 |
| S217 | 0.54 | −1.450E−03 | −8.242E−04 | 1.398E−04 | −1.102E−05 | 1.142E−07 | 2.757E−08 | −1.175E−09 |

Table 6 shows the parameters and condition values for conditions (1)-(13) in accordance with the lens assembly 2 of the second embodiment. It can be seen from Table 6 that the lens assembly 2 of the second embodiment satisfies the conditions (1)-(13). In order to achieve the preferred embodiment of the present invention, at least one of the conditions (1)-(13) is satisfied.

TABLE 6

| | | | | | |
|---|---|---|---|---|---|
| STD | 6.600 mm | G12w | 1.573 mm | G12t | 6.825 mm |
| G23w | 1.216 mm | G23t | 1.856 mm | EFLt-EFLw | 12.688 mm |
| TTL/STD | 3.703 | TTL/(G23w + G23t) | 7.956 | (f7 + f8)/STD | 5.137 |
| f7 × f8 | 226.421 mm² | (f4 + f5)/STD | 5.646 | f4 × f5 | 316.769 mm² |
| R51 × R52 | 34.922 mm² | (EFLw + EFLt)/STD | 5.892 | TTL/(G12w + G12t) | 2.910 |
| G12w/G23w | 1.294 | G12t/G23t | 3.677 | G12t-G12w | 5.252 |

In addition, the field curvature (figure omitted) and distortion (figure omitted) of the lens assembly 2 of the second embodiment can also be effectively corrected, and the image resolution can also meet the requirements. Therefore, the lens assembly 2 of the second embodiment is capable of good optical performance.

Referring to FIG. 6 and FIG. 7, the lens assembly 3 includes a stop ST31, a first lens group LG31, a shading element ST32, a second lens group LG32, a third lens group LG33, and an optical filter OF3, all of which are arranged in order from a first side to a second side along an optical axis OA3. The first lens group LG31 includes a first lens L31, a second lens L32, and a third lens L33, all of which are arranged in order from the first side to the second side along the optical axis OA3. The second lens group LG32 includes a fourth lens L34 and a fifth lens L35, both of which are arranged in order from the first side to the second side along the optical axis OA3. The third lens group LG33 includes a sixth lens L36, a seventh lens L37, and an eighth lens L38, all of which are arranged in order from the first side to the second side along the optical axis OA3. In operation, a light from the first side is imaged on an image plane IMA3.

When the lens assembly 3 zooms from a wide-angle end (as shown in FIG. 6) to a telephoto end (as shown in FIG. 7), the first lens group LG31 is fixed, the second lens group LG32 moves to the second side along the optical axis OA3, and the third lens group LG33 moves to the second side along the optical axis OA3, so that the interval between the first lens group LG31 and the second lens group LG32 is increased and the interval between the second lens group LG32 and the third lens group LG33 is increased. The zoom magnification is approximately 1.82 times (25.634 mm/14.074 mm≈1.82) as the lens assembly 3 of the third embodiment zooms from the wide-angle end (as shown in FIG. 6) to the telephoto end (as shown in FIG. 7).

According to the foregoing, wherein: the eighth lens L38 is a meniscus lens, wherein the first side surface S316 is a concave surface; and both of the first side surface S318 and second side surface S319 of the optical filter OF3 are plane surfaces. With the above design of the lenses, stop ST31, shading element ST32, and at least one of the conditions (1)-(13) satisfied, the lens assembly 3 can have an effective shortened total lens length, an effective increased resolution, an effective corrected aberration, an preferred embodiment of the present invention can be achieved when the lens assembly satisfies at least one of the conditions (1)-(13), refractive power distribution, and surface shape.

Table 7 shows the optical specification of the lens assembly 3 in FIG. 6 and FIG. 7 when the lens assembly 3 is at the wide-angle end and telephoto end, respectively.

TABLE 7

| Wide-angle End | Effective Focal Length = 14.074 mm | F-number = 2.132 |
| | Total Lens Length = 26.080 mm | Field of View = 23.637 degrees |
| Telephoto End | Effective Focal Length = 25.634 mm | F-number = 3.884 |
| | Total Lens Length = 26.080 mm | Field of View = 13.108 degrees |

| Surface Number | Radius of Curvature (mm) | Thickness (mm) | Nd | Vd | Effective Focal Length (mm) | Remark |
| --- | --- | --- | --- | --- | --- | --- |
| S30 | ∞ | 0 | | | | ST31 |
| S31 | 10.630 | 0.931 | 2.002 | 19.325 | −23.496 | L31 |
| S32 | 7.021 | 0.101 | | | | |
| S33 | 4.888 | 2.224 | 1.594 | 67.290 | 7.364 | L32 |
| S34 | −35.596 | 0.081 | | | | |
| S35 | 7.119 | 1.559 | 2.002 | 19.325 | −16.016 | L33 |
| S36 | 4.400 | 0.758 | | | | |
| S37 | ∞ | 1.127(Wide-angle End) | | | | ST32 |
| | | 6.433(Telephoto End) | | | | |
| S38 | −6.066 | 3.316 | 1.651 | 21.514 | 25.988 | L34 |
| S39 | −5.444 | 0.045 | | | | |
| S310 | −13.066 | 4.890 | 1.544 | 55.951 | 10.525 | L35 |
| S311 | −4.517 | 0.463(Wide-angle End) | | | | |
| | | 0.873(Telephoto End) | | | | |
| S312 | −2.006 | 0.569 | 1.671 | 19.243 | −6.979 | L36 |
| S313 | −3.884 | 0.039 | | | | |
| S314 | −4.563 | 1.423 | 1.544 | 55.951 | 65.739 | L37 |
| S315 | −4.494 | 0.057 | | | | |
| S316 | −1308.802 | 1.724 | 1.544 | 55.951 | 11.299 | L38 |
| S317 | −6.271 | 6.563(Wide-angle End) | | | | |
| | | 0.853(Telephoto End) | | | | |
| S318 | ∞ | 0.210 | 1.500 | 60.000 | | OF3 |
| S319 | ∞ | −0.030 | | | | |

The definition of aspheric surface sag z of each aspheric lens in Table 7 is the same as that of in Table 1, and is not described here again. In the third embodiment, the conic constant k and the aspheric coefficients A, B, C, D, E, F, G of each aspheric lens are shown in Table 8.

TABLE 8

| Surface Number | k | A | B | C | D | E | F | G |
| --- | --- | --- | --- | --- | --- | --- | --- | --- |
| S31 | −21.86 | 1.896E−04 | 2.562E−05 | 6.308E−06 | 2.546E−07 | −8.710E−09 | −4.001E−09 | 1.956E−10 |
| S32 | −65.69 | −1.470E−04 | 1.620E−04 | 1.627E−05 | 1.869E−08 | −1.187E−07 | −2.686E−09 | 3.753E−10 |
| S33 | −36.40 | 1.996E−03 | 2.347E−04 | 3.584E−06 | −1.055E−06 | −6.727E−08 | −5.018E−09 | 2.408E−10 |
| S34 | 37.14 | 1.261E−03 | 1.677E−05 | −7.692E−06 | −6.844E−07 | 1.129E−07 | −2.881E−08 | 1.703E−09 |
| S35 | −4.74 | −4.111E−05 | 4.553E−05 | 1.224E−05 | −1.505E−06 | 1.463E−10 | 1.675E−08 | −1.429E−09 |
| S36 | −1.73 | −8.758E−04 | 2.838E−04 | −7.799E−06 | −1.033E−06 | 4.185E−07 | 2.316E−07 | −4.121E−08 |
| S38 | −10.92 | −3.362E−03 | 6.460E−04 | −5.498E−05 | 3.809E−05 | −2.110E−05 | 4.561E−06 | −3.741E−07 |
| S39 | −1.47 | −1.885E−02 | 3.416E−03 | 1.909E−05 | −5.856E−05 | −1.360E−06 | −4.251E−07 | 1.775E−07 |
| S310 | 1.32 | −2.688E−02 | 3.616E−03 | 7.060E−05 | −3.553E−05 | −1.196E−05 | −8.965E−07 | 4.015E−07 |
| S311 | −5.82 | −8.539E−03 | 6.893E−04 | −4.702E−05 | −8.186E−07 | 4.328E−07 | −2.032E−08 | −6.900E−10 |
| S312 | −2.01 | −7.207E−03 | 2.248E−03 | −2.833E−04 | 2.088E−05 | 1.417E−06 | −3.410E−07 | 1.341E−08 |
| S313 | −0.57 | 5.996E−03 | −3.134E−04 | 3.973E−05 | 2.195E−05 | −5.383E−06 | 4.418E−07 | −9.493E−09 |
| S314 | 0.29 | 1.205E−02 | −1.186E−03 | 6.084E−05 | 1.814E−05 | −2.918E−06 | −6.659E−08 | 1.551E−08 |
| S315 | −1.82 | −1.381E−02 | 2.348E−03 | −2.233E−04 | 2.037E−06 | 2.724E−06 | −3.781E−07 | 1.576E−08 |
| S316 | 115.74 | −2.198E−02 | 1.249E−03 | −2.017E−04 | 3.577E−05 | −3.949E−06 | 2.586E−07 | −6.155E−09 |
| S317 | 0.88 | −1.022E−03 | −1.090E−03 | 1.644E−04 | −1.093E−05 | 7.322E−08 | 3.125E−08 | −1.179E−09 |

Table 9 shows the parameters and condition values for conditions (1)-(13) in accordance with the lens assembly 3 of the third embodiment. It can be seen from Table 9 that the lens assembly 3 of the third embodiment satisfies the conditions (1)-(13). In order to achieve the preferred embodiment of the present invention, at least one of the conditions (1)-(13) is satisfied.

TABLE 9

| STD | 6.600 mm | G12w | 1.885 mm | G12t | 7.191 mm |
|---|---|---|---|---|---|
| G23w | 0.463 mm | G23t | 0.873 mm | EFLt-EFLw | 11.560 mm |
| TTL/STD | 3.952 | TTL/(G23w + G23t) | 19.521 | (f7 + f8)/STD | 11.672 |
| f7 × f8 | 742.758 mm² | (f4 + f5)/STD | 5.532 | f4 × f5 | 273.514 mm² |
| R51 × R52 | 59.012 mm² | (EFLw + EFLt)/STD | 6.016 | TTL/(G12w + G12t) | 2.874 |
| G12w/G23w | 4.071 | G12t/G23t | 8.237 | G12t-G12w | 5.306 |

In addition, the field curvature (figure omitted) and distortion (figure omitted) of the lens assembly 3 of the third embodiment can also be effectively corrected, and the image resolution can also meet the requirements. Therefore, the lens assembly 3 of the third embodiment is capable of good optical performance.

Figure 8:
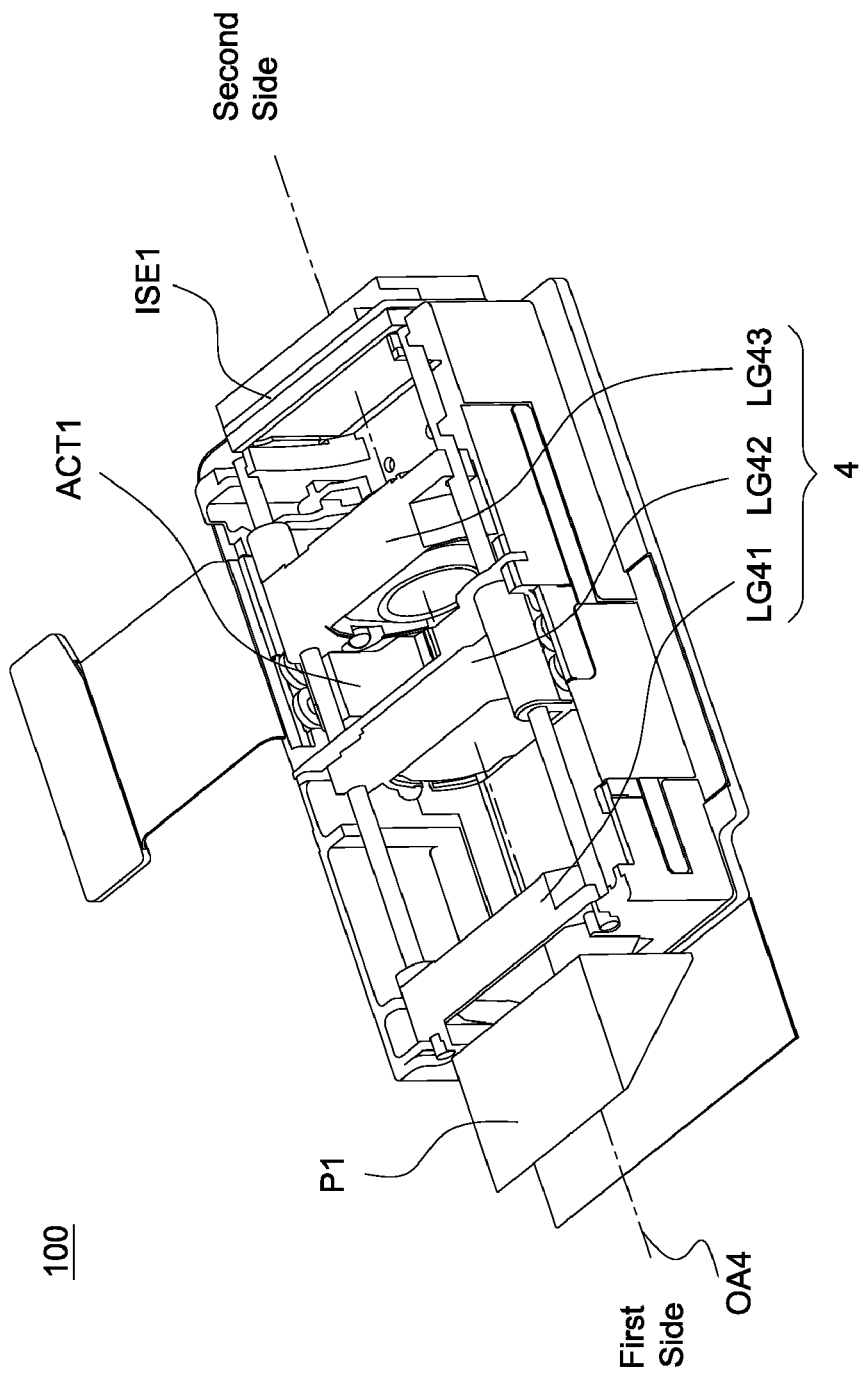
FIG. 8 depicts an image capture apparatus diagram in accordance with an embodiment of the invention.

A detailed description of an image capture apparatus in accordance with an embodiment of the invention is as follows. Referring to FIG. 8, the image capture apparatus 100 includes an optical path turning element P1, a lens assembly 4, an image sensing element ISE1, and an actuator ACT1. The lens assembly 4 includes a first lens group LG41, a second lens group LG42, and a third lens group LG43, all of which are arranged in order from a first side to a second side along an optical axis OA4. The optical path turning element P1 is disposed between the first side and the first lens group LG41. The image sensing element ISE1 is disposed between the third lens group LG43 and the second side. The actuator ACT1 is disposed on one side of the lens assembly 4. In operation, a light from an object (not shown) incident on the optical path turning element P1, the optical path turning element P1 turns the light by 90 degrees and then enters the lens assembly 4, and the object (not shown) is imaged on the image sensing element ISE1 by the lens assembly 4. The actuator ACT1 can drive the second lens group LG42 and the third lens group LG43 to move the second lens group LG42 toward the second side along the optical axis OA4 and the third lens group LG43 to toward the second side along the optical axis OA4, so that the lens assembly 4 is zoomed from a wide-angle end to a telephoto end to change an effective focal length of the lens assembly 4. In other words, when the lens assembly 4 zooms from the wide-angle end to the telephoto end, the first lens group LG41 is fixed and the second lens group LG42 and the third lens group LG43 move to the second side along the optical axis OA4. In this embodiment, the actuator ACT1 can be a driving element which generates magnetic force by a magnet paired with a coil as the coil is charged with electricity, but it is not limited to this. The actuator ACT1 may also be a driving element such as a voice coil motor, a stepping motor, a piezoelectric actuator or a shape memory alloy (SMA) actuator.

The above-mentioned optical path turning element P1 is a prism. However, it has the same effect and falls into the scope of the invention that the optical path turning element P1 is replaced with a reflecting mirror.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
a first lens group which is with positive refractive power;
a second lens group which is with positive refractive power; and
a third lens group which is with positive refractive power;
wherein the first lens group, the second lens group, and the third lens group are arranged in order from a first side to a second side along an optical axis;
wherein the first lens group is fixed, the second lens group can move along the optical axis, and the third lens group can move along the optical axis, so that the lens assembly is zoomed from a wide-angle end to a telephoto end to change an effective focal length;
wherein the lens assembly satisfies at least one of following conditions:

$3<G12t/G23t<9$;

$3<G12t-G12w<6$;

9 mm$<$EFL$t$-EFL$w<$13 mm;

wherein G12w is an interval from the first lens group to the second lens group along the optical axis at the wide-angle end, G12t is an interval from the first lens group to the second lens group along the optical axis at the telephoto end, G23t is an interval from the second lens group to the third lens group along the optical axis at the telephoto end, EFLw is an effective focal length of the lens assembly at the wide-angle end, and EFLt is an effective focal length of the lens assembly at the telephoto end.

2. The lens assembly as claimed in claim 1, wherein:
the first lens group comprises a first lens, a second lens, and a third lens;
the first lens, the second lens, and the third lens are arranged in order from the first side to the second side along the optical axis;
the second lens group comprises a fourth lens and a fifth lens;
the fourth lens and the fifth lens are arranged in order from the first side to the second side along the optical axis;
the third lens group comprises a sixth lens, a seventh lens, and an eighth lens; and
the sixth lens, the seventh lens, and the eighth lens are arranged in order from the first side to the second side along the optical axis.

3. The lens assembly as claimed in claim 2, wherein the first lens is with negative refractive power, the second lens is with positive refractive power, the third lens is with negative refractive power, the fourth lens is with positive refractive power, the fifth lens is with positive refractive power, the sixth lens is with negative refractive power, the seventh lens is with positive refractive power, and the eighth lens is with positive refractive power.

4. The lens assembly as claimed in claim 3, wherein:
the first lens is a meniscus lens and comprises a convex surface facing the first side and a concave surface facing the second side;
the second lens is a biconvex lens and comprises a convex surface facing the first side and another convex surface facing the second side; and
the third lens is a meniscus lens and comprises a convex surface facing the first side and a concave surface facing the second side.

5. The lens assembly as claimed in claim 3, wherein:
the fourth lens is a meniscus lens and comprises a concave surface facing the first side and a convex surface facing the second side; and
the fifth lens is a meniscus lens and comprises a concave surface facing the first side and a convex surface facing the second side.

6. The lens assembly as claimed in claim 3, wherein:
the sixth lens is a meniscus lens and comprises a concave surface facing the first side and a convex surface facing the second side;
the seventh lens is a meniscus lens and comprises a concave surface facing the first side and a convex surface facing the second side; and
the eighth lens comprises a convex surface facing the second side.

7. The lens assembly as claimed in claim 6, wherein the eighth lens is a biconvex lens and further comprises another convex surface facing the first side.

8. The lens assembly as claimed in claim 6, wherein the eighth lens is a meniscus lens and further comprises a concave surface facing the first side.

9. The lens assembly as claimed in claim 1, wherein the second lens group moves to the second side along the optical axis and the third lens group moves to the second side along the optical axis, so that the interval between the first lens group and the second lens group is increased and the interval between the second lens group and the third lens group is increased.

10. The lens assembly as claimed in claim 1, further comprising a stop disposed between the first side and the second side, wherein the lens assembly satisfies at least one of following conditions:

$3 < TTL/STD < 5;$ $4 < (f7+f8)/STD < 12;$ $5 < (f4+f5)/STD < 8;$ $4.6 < (EFLw+EFLt)/STD < 7;$ wherein TTL is an interval from a first side surface of the first lens to an image plane along the optical axis, STD is an effective optical diameter of the stop, f4 is an effective focal length of the fourth lens, f5 is an effective focal length of the fifth lens, f7 is an effective focal length of the seventh lens, f8 is an effective focal length of the eighth lens, EFLw is an effective focal length of the lens assembly at the wide-angle end, and EFLt is an effective focal length of the lens assembly at the telephoto end.

11. The lens assembly as claimed in claim 1, wherein the lens assembly satisfies at least one of following conditions:

$180 \text{ mm}^2 < f7 \times f8 < 800 \text{ mm}^2;$ $250 \text{ mm}^2 < f4 \times f5 < 350 \text{ mm}^2;$ $20 \text{ mm}^2 < R51 \times R52 < 62 \text{ mm}^2;$ $2.2 < TTL/(G12w+G12t) < 4.4;$ $7 < TTL/(G23w+G23t) < 20;$ $1 < G12w/G23w < 6;$ wherein f4 is an effective focal length of the fourth lens, f5 is an effective focal length of the fifth lens, f7 is an effective focal length of the seventh lens, f8 is an effective focal length of the eighth lens, R51 is a radius of curvature of a first side surface of the fifth lens and R52 is a radius of curvature of a second side surface of the fifth lens, TTL is an interval from a first side surface of the first lens to an image plane along the optical axis, G12w is the interval from the first lens group to the second lens group along the optical axis at the wide-angle end, G12t is the interval from the first lens group to the second lens group along the optical axis at the telephoto end, G23w is an interval from the second lens group to the third lens group along the optical axis at the wide-angle end, and G23t is the interval from the second lens group to the third lens group along the optical axis at the telephoto end.

12. An image capture apparatus comprising:
a lens assembly as claimed in claim 1:
an image sensing element;
an optical path turning element; and
an actuator;
wherein the image sensing element is disposed between the third lens group and the second side;
wherein the optical path turning element is disposed between the first side and the first lens group;
wherein the actuator is disposed on one side of the lens assembly;
wherein the optical path turning element, the lens assembly, and the image sensing element are arranged in order from the first side to the second side along the optical axis;
wherein the first lens group is fixed, the second lens group driven by the actuator to move to the second side along the optical axis, and the third lens group driven by the actuator to move to the second side along the optical axis, so that the lens assembly is zoomed from the wide-angle end to the telephoto end to change the effective focal length.

13. A lens assembly comprising:
a first lens group which is with positive refractive power;
a second lens group which is with positive refractive power; and
a third lens group which is with positive refractive power;
wherein the first lens group, the second lens group, and the third lens group are arranged in order from a first side to a second side along an optical axis;
wherein the first lens group comprises a first lens, a second lens, and a third lens; the first lens, the second lens, and the third lens are arranged in order from the first side to the second side along the optical axis; the second lens group comprises a fourth lens and a fifth lens; the fourth lens and the fifth lens are arranged in order from the first side to the second side along the optical axis; the third lens group comprises a sixth lens, a seventh lens, and an eighth lens; and the sixth lens, the seventh lens, and the eighth lens are arranged in order from the first side to the second side along the optical axis;

wherein the lens assembly further comprises a stop disposed between the first side and the second side and zooms from a wide-angle end to a telephoto end to change an effective focal length;

wherein the lens assembly satisfies at least one of following conditions:

$3<TTL/STD<5$;

$4<(f7+f8)/STD<12$;

$5<(f4+f5)/STD<8$;

$4.6<(EFLw+EFLt)/STD<7$;

wherein TTL is an interval from a first side surface of the first lens to an image plane along the optical axis, STD is an effective optical diameter of the stop, f4 is an effective focal length of the fourth lens, f5 is an effective focal length of the fifth lens, f7 is an effective focal length of the seventh lens, f8 is an effective focal length of the eighth lens, EFLw is an effective focal length of the lens assembly at the wide-angle end, and EFLt is an effective focal length of the lens assembly at the telephoto end.

14. The lens assembly as claimed in claim 13, wherein the first lens is with negative refractive power, the second lens is with positive refractive power, the third lens is with negative refractive power, the fourth lens is with positive refractive power, the fifth lens is with positive refractive power, the sixth lens is with negative refractive power, the seventh lens is with positive refractive power, and the eighth lens is with positive refractive power.

15. The lens assembly as claimed in claim 14, wherein:
the first lens is a meniscus lens and comprises a convex surface facing the first side and a concave surface facing the second side;
the second lens is a biconvex lens and comprises a convex surface facing the first side and another convex surface facing the second side;
the third lens is a meniscus lens and comprises a convex surface facing the first side and a concave surface facing the second side;
the fourth lens is a meniscus lens and comprises a concave surface facing the first side and a convex surface facing the second side;
the fifth lens is a meniscus lens and comprises a concave surface facing the first side and a convex surface facing the second side;
the sixth lens is a meniscus lens and comprises a concave surface facing the first side and a convex surface facing the second side;
the seventh lens is a meniscus lens and comprises a concave surface facing the first side and a convex surface facing the second side; and
the eighth lens comprises a convex surface facing the second side.

16. The lens assembly as claimed in claim 15, wherein the eighth lens is a biconvex lens and further comprises another convex surface facing the first side, or the eighth lens is a meniscus lens and further comprises a concave surface facing the first side.

17. The lens assembly as claimed in claim 13, wherein the second lens group moves to the second side along the optical axis and the third lens group moves to the second side along the optical axis, so that the interval between the first lens group and the second lens group is increased and the interval between the second lens group and the third lens group is increased.

18. The lens assembly as claimed in claim 13, wherein the lens assembly zooms from a wide-angle end to a telephoto end to change an effective focal length and the lens assembly satisfies at least one of following conditions:

$180\ mm^2<f7 \times f8<800\ mm^2$;

$250\ mm^2<f4 \times f5<350\ mm^2$;

$20\ mm^2<R51 \times R52<62\ mm^2$;

$2.2<TTL/(G12w+G12t)<4.4$;

$7<TTL/(G23w+G23f)<20$;

$1<G12w/G23w<6$;

$3<G12t/G23t<9$;

$3<G12t-G12w<6$;

$9\ mm<EFLt-EFLw<13\ mm$;

wherein f4 is an effective focal length of the fourth lens, f5 is an effective focal length of the fifth lens, f7 is an effective focal length of the seventh lens, f8 is an effective focal length of the eighth lens, R51 is a radius of curvature of a first side surface of the fifth lens, R52 is a radius of curvature of a second side surface of the fifth lens, TTL is an interval from a first side surface of the first lens to an image plane along the optical axis, G12w is an interval from the first lens group to the second lens group along the optical axis at the wide-angle end, G12t is an interval from the first lens group to the second lens group along the optical axis at the telephoto end, G23w is an interval from the second lens group to the third lens group along the optical axis at the wide-angle end, G23t is an interval from the second lens group to the third lens group along the optical axis at the telephoto end, EFLw is an effective focal length of the lens assembly at the wide-angle end, and EFLt is an effective focal length of the lens assembly at the telephoto end.

19. A lens assembly comprising:
a first lens group which is with positive refractive power,
a second lens group which is with positive refractive power; and
a third lens group which is with positive refractive power;
wherein the first lens group, the second lens group, and the third lens group are arranged in order from a first side to a second side along an optical axis;
wherein the second lens group comprises a fourth lens and a fifth lens; the fourth lens and the fifth lens are arranged in order from the first side to the second side along the optical axis; the third lens group comprises a sixth lens, a seventh lens, and an eighth lens; and the sixth lens, the seventh lens, and the eighth lens are arranged in order from the first side to the second side along the optical axis;
wherein the lens assembly zooms from a wide-angle end to a telephoto end to change an effective focal length and satisfies at least one of following conditions:

$3 < G12t/G23t < 9$;

$3 < G12t - G12w < 6$;

$180\ mm^2 < f7 \times f8 < 800\ mm^2$;

$250\ mm^2 < f4 \times f5 < 350\ mm^2$;

wherein G12w is an interval from the first lens group to the second lens group along the optical axis at the wide-angle end, G12t is an interval from the first lens group to the second lens group along the optical axis at the telephoto end, G23t is an interval from the second lens group to the third lens group along the optical axis at the telephoto end, f4 is an effective focal length of the fourth lens, f5 is an effective focal length of the fifth lens, f7 is an effective focal length of the seventh lens, and f8 is an effective focal length of the eighth lens.

20. The lens assembly as claimed in claim 19, further comprising a stop disposed between the first side and the second side and zooming from a wide-angle end to a telephoto end to change an effective focal length, wherein the lens assembly satisfies at least one of following conditions:

$3 < TTL/STD < 5$;

$4 < (f7+f8)/STD < 12$;

$5 < (f4+f5)/STD < 8$;

$4.6 < (EFLw+EFLt)/STD < 7$;

wherein TTL is an interval from a first side surface of the first lens to an image plane along the optical axis, STD is an effective optical diameter of the stop, f4 is an effective focal length of the fourth lens, f5 is an effective focal length of the fifth lens, f7 is an effective focal length of the seventh lens, f8 is an effective focal length of the eighth lens, EFLw is an effective focal length of the lens assembly at the wide-angle end, and EFLt is an effective focal length of the lens assembly at the telephoto end.

\* \* \* \* \*